US011231197B2

(12) United States Patent
McQuade et al.

(10) Patent No.: US 11,231,197 B2
(45) Date of Patent: Jan. 25, 2022

(54) ULTRAVIOLET (UV) LIGHT-BASED REFRIGERANT LEAK DETECTION SYSTEM AND METHOD

(71) Applicant: Johnson Controls Technology Company, Auburn Hills, MI (US)

(72) Inventors: William F. McQuade, New Cumberland, PA (US); Neelkanth Gupte, Katy, TX (US)

(73) Assignee: Johnson Controls Technology Company, Auburn Hills, MI (US)

( * ) Notice: Subject to any disclaimer, the term of this patent is extended or adjusted under 35 U.S.C. 154(b) by 866 days.

(21) Appl. No.: 15/871,691

(22) Filed: Jan. 15, 2018

(65) Prior Publication Data
US 2019/0170384 A1  Jun. 6, 2019

Related U.S. Application Data

(60) Provisional application No. 62/593,606, filed on Dec. 1, 2017.

(51) Int. Cl.
| *F24F 11/36* | (2018.01) |
| *F25B 49/02* | (2006.01) |
| *G01N 21/63* | (2006.01) |
| *G01M 3/20* | (2006.01) |
| *G01N 21/01* | (2006.01) |
| *F25B 13/00* | (2006.01) |
| *F25B 49/00* | (2006.01) |

(52) U.S. Cl.
CPC .............. *F24F 11/36* (2018.01); *F25B 49/02* (2013.01); *G01M 3/20* (2013.01); *G01N 21/63* (2013.01); *F25B 13/00* (2013.01); *F25B 49/005* (2013.01); *F25B 2500/222* (2013.01); *G01N 2021/0193* (2013.01)

(58) Field of Classification Search
CPC ............ F25B 2500/22; F25B 2500/221; F25B 2500/23; F25B 2500/24; F25B 2500/32; F25B 2500/222; G01M 3/007
USPC ......................................................... 62/127
See application file for complete search history.

(56) References Cited

U.S. PATENT DOCUMENTS

| 6,327,897 B1 * | 12/2001 | Scaringe ................. G01M 3/20 252/301.19 |
| RE38,342 E | 12/2003 | Trigiani |
| 7,141,811 B2 | 11/2006 | Trigiani |
| 7,939,804 B2 | 5/2011 | Schmidt |
| 2007/0156373 A1 * | 7/2007 | Yamashita ............ F25B 49/005 702/182 |
| 2008/0295580 A1 * | 12/2008 | Minor .................... G01N 21/33 73/40.7 |

(Continued)

FOREIGN PATENT DOCUMENTS

WO    2016075541 A1    5/2016

*Primary Examiner* — Nelson J Nieves
*Assistant Examiner* — Meraj A Shaikh
(74) *Attorney, Agent, or Firm* — Fletcher Yoder, P.C.

(57) ABSTRACT

A leak detection system of a heating, ventilating, and air conditioning (HVAC) system includes a sensor configured to detect a UV tracer in a monitored gas volume of the HVAC system. The leak detection system also includes a controller communicatively coupled to the sensor. The controller is configured to modify operation of the HVAC system in response to the sensor detecting the UV tracer in the monitored gas volume.

37 Claims, 8 Drawing Sheets

(56) References Cited

U.S. PATENT DOCUMENTS

| | | | |
|---|---|---|---|
| 2010/0122545 A1* | 5/2010 | Minor | C10M 105/06 62/324.1 |
| 2010/0319375 A1* | 12/2010 | Matsubara | F25B 49/022 62/228.1 |
| 2012/0007744 A1* | 1/2012 | Pal | G01M 3/243 340/605 |
| 2016/0178229 A1* | 6/2016 | Chen | F24F 11/70 62/56 |
| 2017/0003168 A1* | 1/2017 | Fujii | G01M 3/38 |
| 2017/0016797 A1* | 1/2017 | Park | G01N 29/032 |
| 2017/0074562 A1 | 3/2017 | Appler et al. | |
| 2018/0073762 A1* | 3/2018 | Yajima | F24F 11/89 |
| 2018/0143097 A1* | 5/2018 | Hun | G01M 3/226 |

\* cited by examiner

ULTRAVIOLET (UV) LIGHT-BASED REFRIGERANT LEAK DETECTION SYSTEM AND METHOD

CROSS-REFERENCE TO RELATED APPLICATION

This application is a Non-Provisional Applications claiming priority to U.S. Provisional Application No. 62/593,606, entitled "ULTRAVIOLET (UV) LIGHT-BASED REFRIGERANT LEAK DETECTION SYSTEM AND METHOD," filed Dec. 1, 2017, which is hereby incorporated by reference in its entirety for all purposes.

BACKGROUND

The present disclosure relates generally to heating, ventilating, and air conditioning systems (HVAC) and, more particularly, to ultraviolet (UV)-based leak detection systems that are integrated into HVAC systems.

Residential, light commercial, commercial, and industrial HVAC systems are used to control temperatures and air quality in residences and buildings. Generally, the HVAC systems may circulate a refrigerant through a closed refrigeration circuit between an evaporator, where the refrigerant absorbs heat, and a condenser, where the refrigerant releases heat. The refrigerant flowing within the refrigeration circuit is generally formulated to undergo phase changes within the normal operating temperatures and pressures of the system so that quantities of heat can be exchanged by virtue of the latent heat of vaporization of the refrigerant. As such, the refrigerant flowing within a HVAC system travels through multiple conduits and components of the refrigeration circuit. Inasmuch as refrigerant leaks compromise system performance or result in increased costs, for example, maintenance and/or operating costs, it is accordingly desirable to provide detection and response systems and methods for the HVAC system to reliably detect and respond to any refrigerant leaks of the HVAC system.

SUMMARY

In an embodiment, a leak detection system of a heating, ventilating, and air conditioning (HVAC) system includes a sensor configured to detect a UV tracer in a monitored gas volume of the HVAC system. The leak detection system also includes a HVAC controller communicatively coupled to the sensor. The HVAC controller is configured to modify operation of the HVAC system in response to the sensor detecting the UV tracer in the monitored gas volume.

In another embodiment, a leak detection system of a heating, ventilating, and air conditioning (HVAC) system includes a vapor compression system configured to circulate a refrigerant that includes an ultraviolet (UV) tracer. The leak detection system includes a sensor configured to measure a concentration of the UV tracer in a monitored gas volume near the vapor compression system of the HVAC system. The leak detection system also includes a controller configured to: determine a concentration of refrigerant in the monitored gas volume based on the concentration of the UV tracer measured by the sensor; and modify operation of the HVAC system when the concentration of refrigerant in the monitored gas volume is greater than a predetermined threshold value.

In another embodiment, the present disclosure relates to a method of operating a sensor to detect a refrigerant in a monitored gas volume associated with a heating, ventilation, and air conditioning (HVAC) system. A processor of a control unit of the HVAC system collects a sample from a monitored gas volume. Next, the processor measures an amount of ultraviolet (UV) tracer in the sample. Next, the processor determines an amount of refrigerant present in the monitored gas volume based at least in part on the measured amount of UV tracer in the sample. Then, the processor modifies operation of the HVAC system in response to determining that the amount of leaked refrigerant in the monitored gas flow volume is greater than a predetermined threshold value, wherein modifying comprises at least impeding the HVAC system from activating.

DETAILED DESCRIPTION

Figure 1:
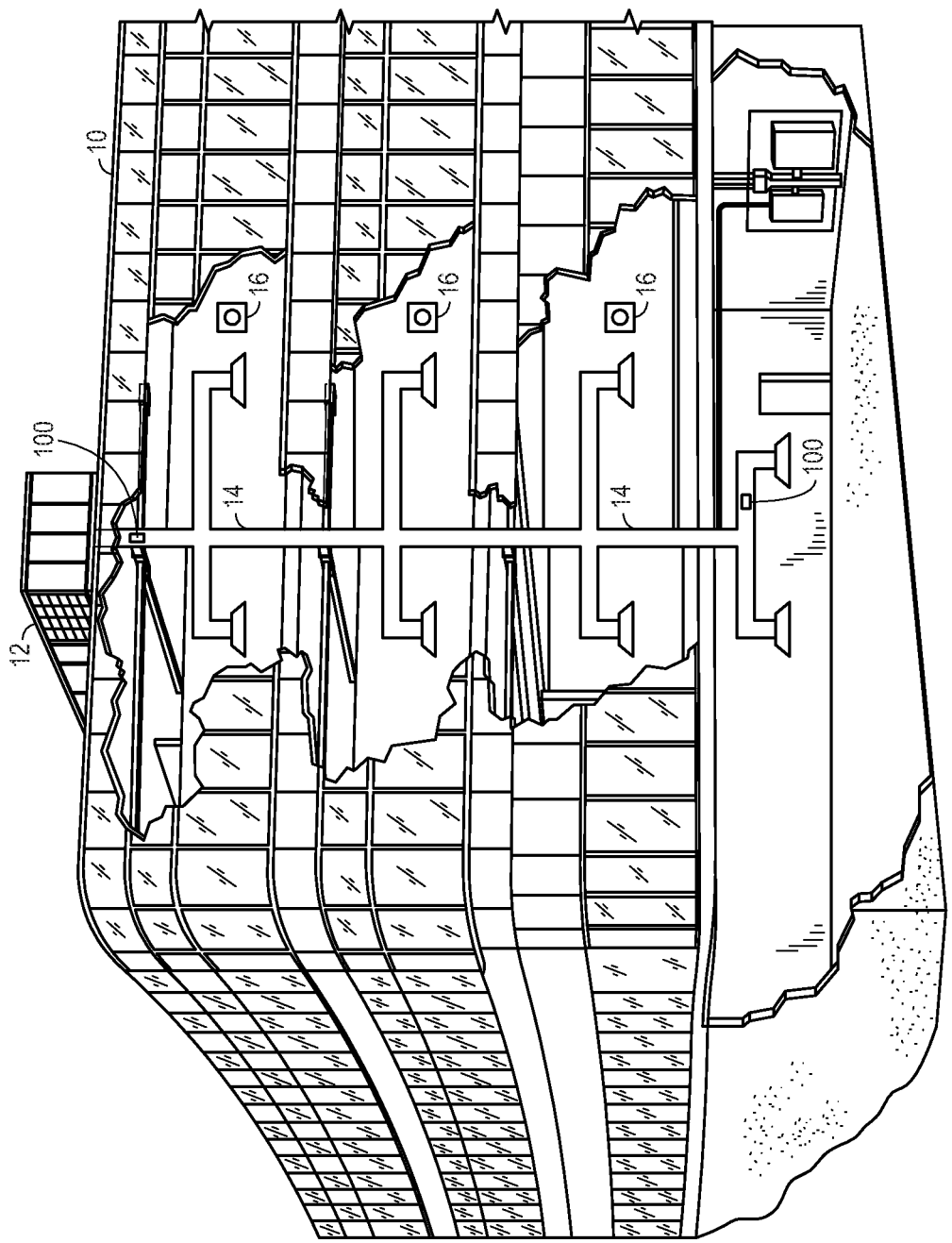
FIG. 1 is a perspective view of a commercial or industrial HVAC system, in accordance with embodiments of the present technique.

As discussed above, a HVAC system generally includes a refrigerant flowing within a refrigeration circuit, also referred to herein as a vapor compression system. The refrigerant flows through multiple conduits and components while undergoing phase changes to enable the HVAC system to condition an interior space of a building. For example, the refrigerant may be or include R32, R1234ze, R1234yf, R-454A, R-454C, R-455A, R-447A, R-452B, R-454B, or another suitable refrigerant.

In certain embodiments, the refrigerant may inadvertently leak from a flow path of the refrigeration circuit due to wear or degradation to components, or imperfect joints or connections within the refrigeration circuit. If undetected, a concentration of leaked refrigerant in the HVAC system may increase to or beyond a predefined concentration threshold. While certain refrigerant leaks may be difficult to directly detect, it is presently recognized that UV tracers are generally more easily and/or accurately detected or measured than refrigerant gases themselves. As such, at least one UV tracer is included in the formulation of the refrigerant charge within the HVAC system to facilitate the detection of refrigerant leaks by the disclosed leak detection system. It may be noted that these UV tracers generally have suitable physical properties and/or functionality to substantially minimize the effect of the UV tracer on the performance of the refrigerant within the refrigerant circuit of the HVAC system.

With the foregoing in mind, the present disclosure is directed to a UV-based leak detection system that is designed to be integrated into a HVAC system, and designed to indirectly detect leaked refrigerant in a monitored gas volume associated with the HVAC system. More specifically, the disclosed integrated, UV-based leak detection system (hereinafter "leak detection system") detects a presence or concentration of leaked refrigerant by optically measuring a concentration of UV tracers in a sample of the monitored gas volume. Since these UV tracers are included in the refrigerant formulation when the HVAC system is charged, they are able to escape from the refrigeration circuit along with leaking refrigerant.

As discussed in detail below, the disclosed leak detection system generally includes at least one UV sensor that uses UV light to measure a concentration of UV tracers in the sample of the monitored gas volume. To perform this UV-based measurement, the disclosed leak detection system includes an UV light source that illuminates the sample of the monitored gas volume, and includes an UV light detector that measures an intensity of UV light that is modified by interacting with UV tracers present in the sample. Additionally, a HVAC controller, or another suitable controller or processor of the system, can determine the presence or concentration of leaked refrigerant in the monitored gas volume based on the measurements of the UV light detector.

Furthermore, since the disclosed leak detection system is integrated into the HVAC system, the HVAC controller, or another suitable controller, can coordinate operation of the leak detection system, as well as the remainder HVAC system. For example, as discussed below, to enhance leak detection, the HVAC controller may prompt the UV sensor to particularly collect and analyze samples for UV tracers after switching the HVAC system to an idle state or off-cycle. Additionally, the HVAC controller can modify operation of the HVAC system in response to determining that the concentration of leaked refrigerant exceeds a predetermined threshold value. For example, the HVAC controller can provide suitable control signals to halt operation or to prevent reactivation of the HVAC system, as well as provide an audible or visual alarm indicating the detected refrigerant leak. As such, the presently disclosed leak detection system enables the HVAC system to reliably detect and respond to refrigerant leaks.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes a HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
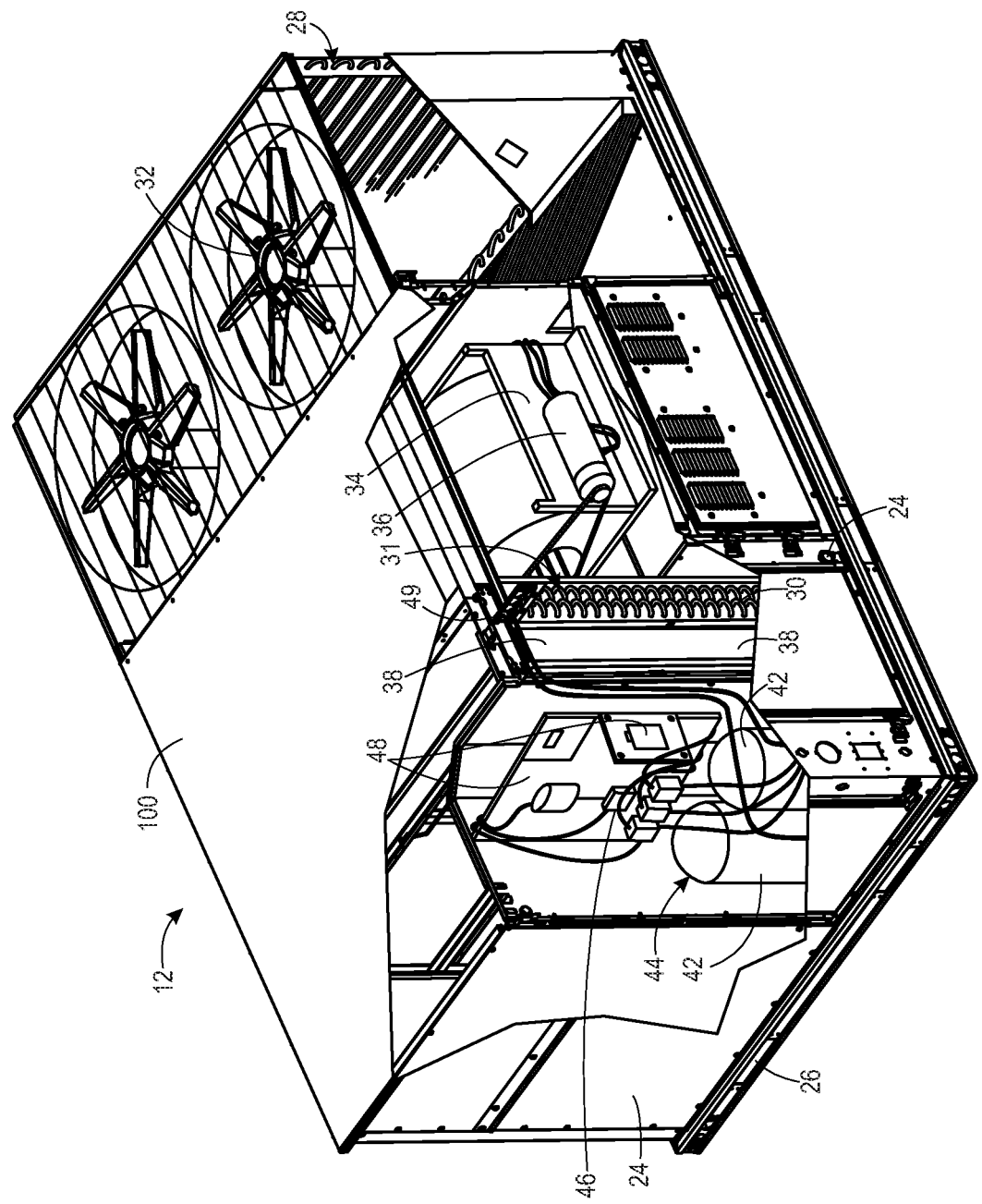
FIG. 2 is an illustration of a packaged unit of the HVAC system shown in FIG. 1, in accordance with embodiments of the present technique.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
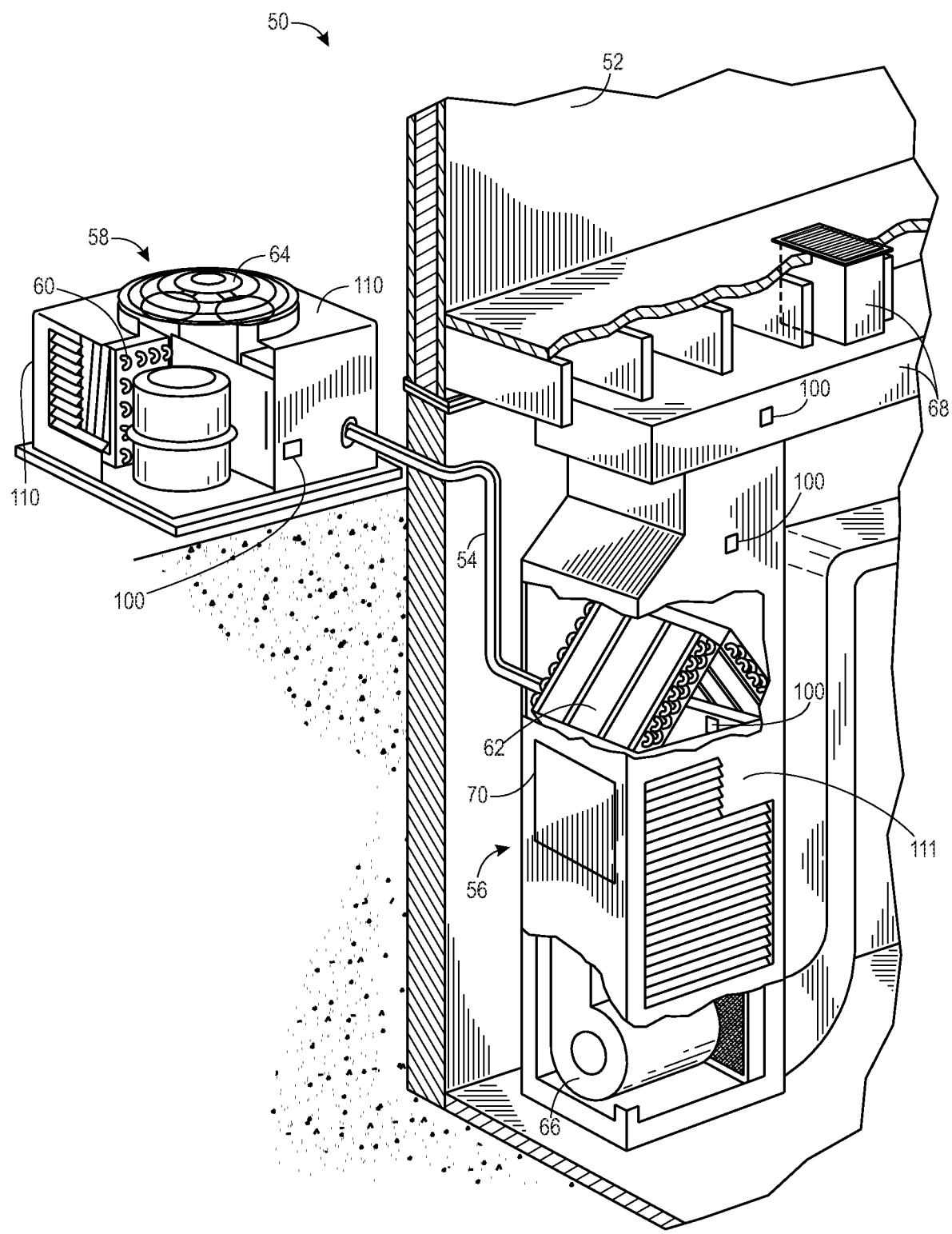
FIG. 3 is an illustration of a split system of the HVAC system shown in FIG. 1, in accordance with embodiments of the present technique.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form ultraviolet tracers. The ultraviolet tracers may pass through tubes or piping in a heat exchanger that is separate from heat exchanger 62, such that air directed by the blower 66 passes over the tubes or pipes and extracts heat from the ultraviolet tracers. The heated air may then be routed from the furnace system 70 to the ductwork 68 for heating the residence 52.

Figure 4:
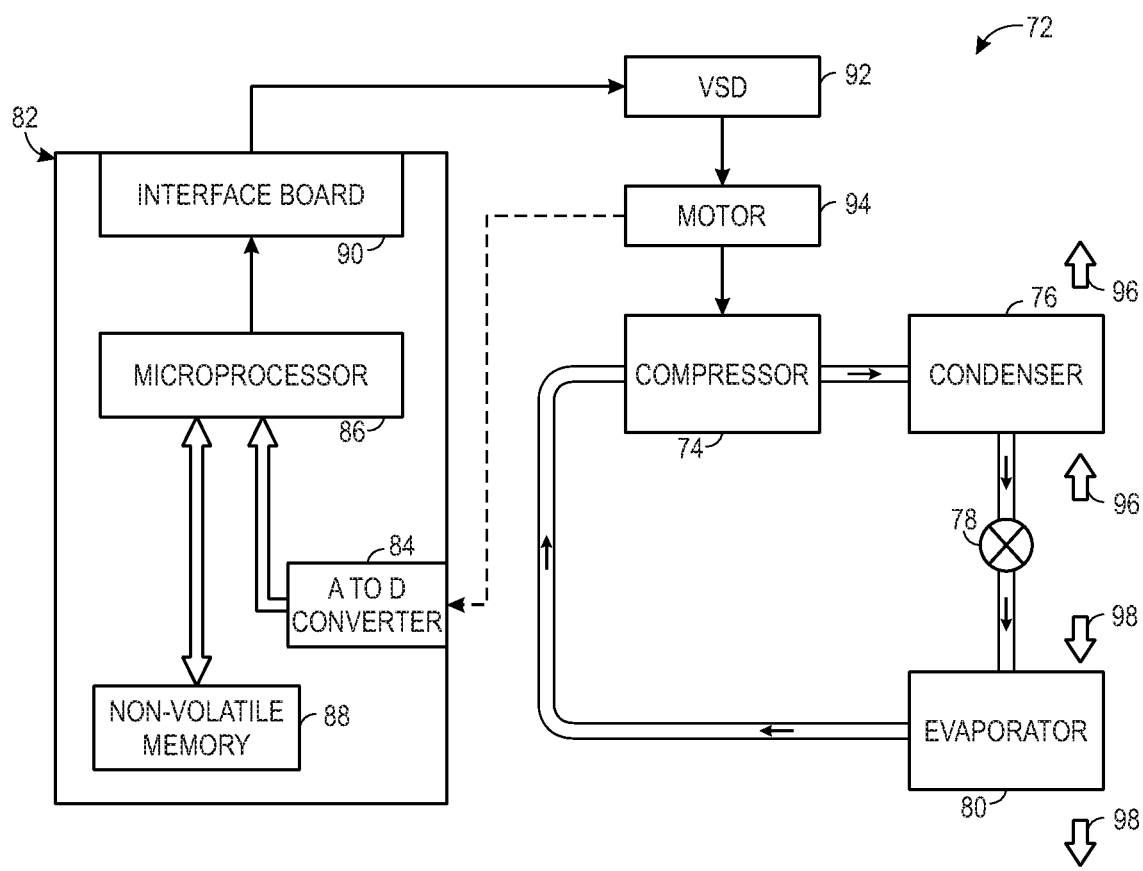
FIG. 4 is a schematic diagram of a refrigeration system of the HVAC system shown in FIG. 1, in accordance with embodiments of the present technique.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
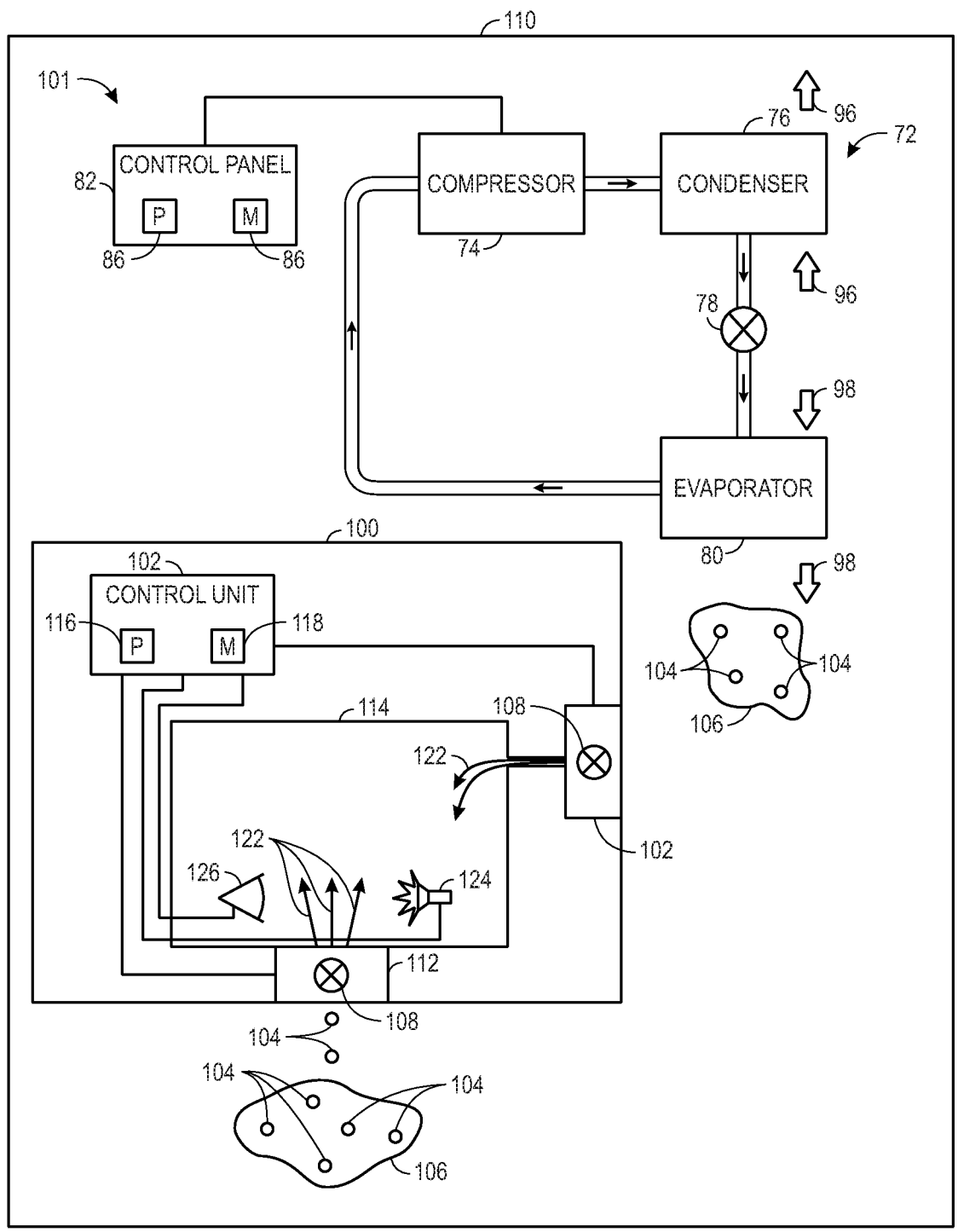
FIG. 5 is a schematic diagram of the HVAC system shown in FIG. 4 including an integrated, UV-based leak detection system, in accordance with embodiments of the present technique.

FIG. 5 is a diagram illustrating an embodiment of a leak detection system 101 having an ultraviolet (UV) tracer sensor 100 that is communicatively coupled to the control panel 82 of the HVAC unit 12. In certain embodiments, the UV tracer sensor 100 may be integrated into the HVAC unit 12 during manufacturing, retrofitted into existing HVAC units 12 after manufacturing, or implemented as an external sensor that is communicatively coupled to the control panel 82 via a wired or wireless communication channel. For example, the UV tracer sensor 100 may be disposed in the ductwork 14. As such, the UV tracer sensor 100 is capable of providing signals to the control panel 82 that are indicative of the presence or absence of refrigerant within a sample 104 of air.

The disclosed UV tracer sensor 100 generally collects the sample 104 of gas from a monitored gas volume 106 to determine whether a leaked refrigerant is present within the sample 104. As illustrated in FIG. 5, the UV tracer sensor 100 is fluidly coupled to a monitored gas volume 106 near the evaporator 80 of the HVAC unit 12 via a valve 108. As such, the UV tracer sensor 100 is capable of receiving the sample 104 from the monitored gas volume 106. In certain embodiments, the leak detection system 101 may include one or more UV tracer sensors 100 disposed within the cabinet 24 of the HVAC unit 12, or within the casing 110 of the outdoor HVAC unit 58, or within the casing 111 of the indoor HVAC unit 56, and the monitored gas volume 106 corresponds to an interior air volume within the casing or packaging of these respective units, as indicated FIGS. 2 and 3. As discussed above in certain embodiments, the UV tracer sensor 100 may be disposed near the indoor heat exchanger 62, or evaporator 62. For example, the UV tracer sensor 100 may be disposed within a few inches, adjacent to, or directly below the evaporator 62. In other embodiments, a UV tracer sensor 100 may be disposed within the ductwork 14 of the building 10, as illustrated in FIGS. 1 and 4, and the monitored gas volume 106 corresponds to an interior air volume within the ductwork 14.

The illustrated embodiment of the UV tracer sensor 100 includes a control unit 102, a sample preparation unit 112, and an UV tracer detection unit 114 that cooperate to enable the UV tracer sensor 100 to function as disclosed. In general, the sample preparation unit 112 collects the sample 104 from the monitored gas volume 106 and prepares the sample for detection, the UV tracer detection unit 114 identifies UV tracers in the prepared sample, and the control unit 102 controls the operation of the other units. In other embodiments, the UV tracer sensor 100 may lack the control unit 102 and the microprocessor 86 of the control panel 82 may control operation of other units of the UV tracer sensor 100, as set forth herein. Additionally, certain embodiments of the UV tracer sensor 100 may lack the sample preparation unit 112, and the UV tracer detection unit 114 may detect UV tracers in the sample 104 without extracting, collecting, or otherwise removing the sample from the monitored gas volume 106.

The control unit 102 of the illustrated embodiment of the UV tracer sensor 100 includes a processor 116 and memory 118. The memory 118 stores computer readable instructions that are executed by the processor 116 to control operation of the UV tracer sensor 100. For example, based on these instructions, the processor 116 can provide suitable control signals to activate, deactivate, and/or modify operation of the various components of the UV tracer sensor 100 to enable the sensor to detect and/or measure an amount of leaked refrigerant in the sample 104. Additionally, the processor 116 can determine a presence or concentration of leaked refrigerant in the sample 104 based on the signals received from the UV tracer detection unit 114, as discussed below.

For the embodiment illustrated in FIG. 5, the sample preparation unit 112 of the UV tracer sensor 100 includes suitable elements to prepare the sample 104 for detection by the UV tracer detection unit 114. For example, the illustrated sample preparation unit 112 includes a valve 108 that is communicatively coupled to the processor 116 of the control unit 102. As such, the control unit 102 can provide suitable control signals to monitor and adjust the position of the valve 108 to control an amount or rate that the sample 104 is collected from the monitored gas volume 106. In other embodiments, the sample preparation unit 112 may include dampers, adjustable louvers, or other suitable flow control mechanism, in accordance with the present disclosure. In certain embodiments, the sample preparation unit 112 may include an air moving device. For example, the air moving device may be a fan, blower, or compressor. In certain embodiments, the sample preparation unit 112 may include one or more filters to remove particulates, moisture, or other components from the sample 104 that might interfere with later analysis for UV tracers. In certain embodiments, the sample preparation unit 112 may include a heater or another suitable mechanism device to warm the sample 104. Additionally, it is presently recognized that compressing the sample might increase the concentration of UV tracers (per unit volume) in the sample, and as such, in certain embodiments, the sample preparation unit 112 may include a compressor that compresses the sample for UV analysis.

In the illustrated embodiment, the UV tracer detection unit 114 is fluidly coupled to the sample preparation unit 112 and receives the sample gas flow 122 from the sample preparation unit 112. The UV tracer detection unit 114 includes at least one UV light source 124 illuminates the sample gas flow 122 and at least one light detector 126 that interacts with and measures the intensity of light from the UV light source 124. The intensity of light that may change based on the presence or absence of UV tracers in the sample gas flow 122. Additionally, the intensity of the light may be proportional to the concentration of UV tracers present in the gas flow. The UV light source 124 may be a light-emitting diode (LED), laser, or lamp. As such, the light detector 126 is communicatively coupled to the processor 116 of the control unit 102 to provide suitable signals that are indicative of the presence or concentration of UV tracers present in the sample gas flow 122. In certain embodiments, the light detector 126 may directly measure a change in an optical property, such as a change in absorption, scattering, emission, fluorescence, and luminescence, as a result of the sample gas flow 122 that is indicative of the presence or concentration of a UV tracer. Additionally, the light detector 126 is fluidly coupled to the external environment and releases the sample gas flow 122 from the UV tracer sensor 100 after traversing the UV tracer detection unit 114.

Based on signals received from the light detector 126 of the UV tracer detection unit 114, the processor 116 of the control unit 102 may send a signal to the microprocessor 86 of the control panel 82 to modify operation of the HVAC unit 12. Modifying the HVAC unit 12 may include shutting down the HVAC unit 12, preventing reactivation of the HVAC unit 12, sending a signal to a user, such as an audible or visual signal. It is also presently recognized that it can be advantageous to control the operation of the UV tracer sensor 100 based on the state of the HVAC unit 12, in certain embodiments. For example, the HVAC can detect refrigerant gases prior to reactivation of the HVAC system to mitigate any potential risks of ignition. In certain embodiments, the control panel 82 may send signals to the control unit 102 to control operation of the UV tracer sensor 100. For example, the microprocessor 86 of the control panel 82 might send signals to the processor 116 of the control unit 102 indicating whether the HVAC system is in an idle state. For example, an idle state may be that the compressor 74 of the vapor compression system 72 is deactivated, or that fans associated with the condenser 76 and/or evaporator 80 are deactivated. As such, in certain embodiments, the control panel 82 and control unit 102 may cooperate to activate the UV tracer sensor 100 based on the state of the HVAC system. As mentioned, during operation of the UV tracer sensor 100, the UV tracer detection unit 114 provides signals indicative of the presence of leaked refrigerant gas in the sample 104. Based on the data received by the control unit 102 from the UV tracer detection unit 114, the control unit 102 makes a determination whether to send a signal to the control panel 82 and/or an alert or alarm indication to a user.

Returning briefly to FIG. 3, the outdoor HVAC unit 58 and indoor HVAC unit 56 are illustrated as including one or more UV tracer sensors 100 disposed in one or more positions within the HVAC system. It may be noted that, in certain embodiments, the blower 66 may not always be disposed at the bottom of the indoor HVAC unit 56. As shown, the UV tracer sensor 100 is disposed in an outdoor HVAC unit 58. Suitable locations for the UV tracer sensor 100 include locations that have limited ambient light exposure to prevent interference with UV tracer detection unit 114. As also shown, the UV tracer sensor 100 may be disposed in the indoor HVAC unit 56. For example, as illustrated, the UV tracer sensor 100 may be disposed near a heat exchanger 62, or within the ductwork 14. It is presently recognized that disposing the UV tracer sensor 100 in the ductwork 14, near the heat exchanger 60, and/or near the heat exchanger 62 may enable the UV tracer sensor 100 to acquire a greater concentration of UV tracer during a leak, as the UV tracer sensor 100 is closer to the vapor compression system 72 and, therefore, the potential refrigerant leak. For example, the UV tracer sensor 100 may be disposed near the vapor compression system 62, the heat exchanger 60, and/or heat exchanger 62. In this context, "near" may be within a few inches, adjacent to, or directly below the heat exchangers 60 and/or 62. As stated above, the UV tracer sensor 100 may be disposed near the heat exchangers, particularly the evaporator 62 of an indoor HVAC unit, to analyze samples 104 having leaked refrigerant that collects below the evaporator 62, particularly when the HVAC unit 56 is idle.

Figure 6:
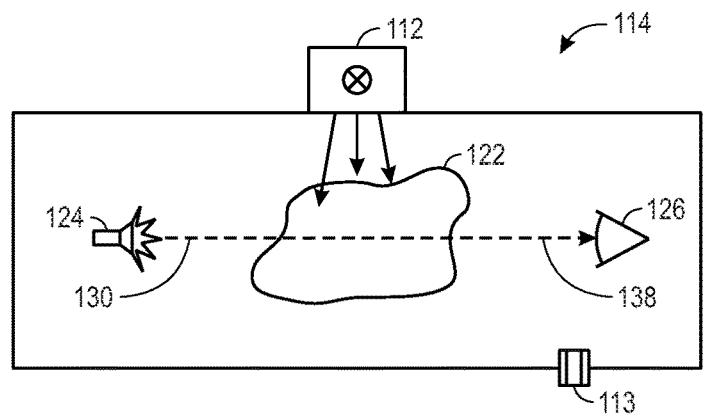
FIG. 6 is a schematic diagram of an UV tracer detection unit of the integrated, UV-based leak detection system, in accordance embodiments of the present technique.

FIG. 6 is a schematic diagram illustrating an embodiment of the UV tracer detection unit 114 of the UV tracer sensor 100, in accordance with the present technique. More specifically, the light detector 126 illustrated in FIG. 6 optically detects or measures the presence or concentration of UV tracers in the sample gas flow 122. The illustrated embodiment includes an UV light source 124 and a light detector 126. The UV light source 124 generates emitted light 130 having an intensity that is detected by the light detector 126. During operation of the embodiment of the UV tracer detection unit 114 illustrated in FIG. 6, emitted light 130 from the UV light source 124 that interacts with the sample gas flow 122 received from the sample preparation units 112 may result in modified light 138. Modified light 138 may result from emitted light 130 that is scattered, absorbed, or absorbed and subsequently reemitted, for example, through fluorescence or Raman. The modified light 138 may have an intensity that differs from the intensity of the emitted light, which is proportional to the concentration of UV tracer in the sample gas flow 122, and/or frequency of light emitted by the UV light source 124. In certain embodiments, no modified light 138 is detected by the light detector 128, indicating that the amount of UV tracer present in the sample gas flow 122 was sufficient enough to block the emitted light 130 from reaching the light detector 128. The light detector 128 is disposed in suitable positions downstream from the UV light source 124 to detect a change in the emitted light 130 based on the presence of UV tracers in the sample gas flow 122. The illustrated embodiment also includes an outlet 113 which allows the gas to flow out of the UV tracer detection unit 114 after measuring the presence or concentration of UV tracers in the sample gas flow 122.

Figure 7:
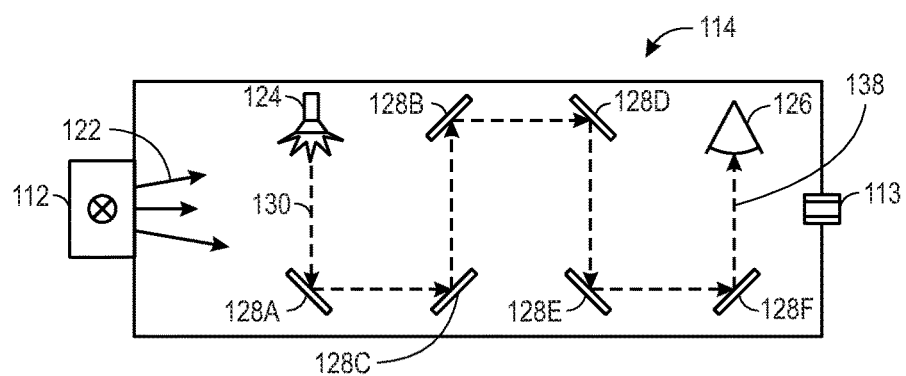
FIG. 7 is a schematic diagram of an UV tracer detection unit of the integrated, UV-based leak detection system, in accordance embodiments of the present technique.

FIG. 7 is a schematic diagram of another embodiment of the UV tracer detection unit 114 of the UV tracer sensor 100, in accordance with the present technique. The UV tracer detection unit 114 may detect a presence or concentration of UV tracers using the light detector 128 based on a change in the initial intensity and/or frequency of light from the UV light source 124. The UV tracer detection unit 114 illustrated in FIG. 7 includes multiple mirrors 128a, 128b, 128c, 128d, 128e, 128f that increase the path length of emitted light 130 from the UV light source 124 before detection. As such, the emitted light 130 interacts with a greater volume of sample gas flow 122. When UV tracers are present in the sample gas flow 122 as the result of a refrigerant leak, this results in a more pronounced change in the intensity and/or frequency of the emitted light 130 that is subsequently measured by the light detector 128. Additionally, the intensity of the light may be proportional to the amount or concentration of UV tracer present in the sample gas flow 122. The illustrated embodiment also includes an outlet 113 which allows the gas to flow out of the UV tracer detection 114 after measuring the presence or concentration of UV tracers in the sample gas flow 122.

Figure 8:
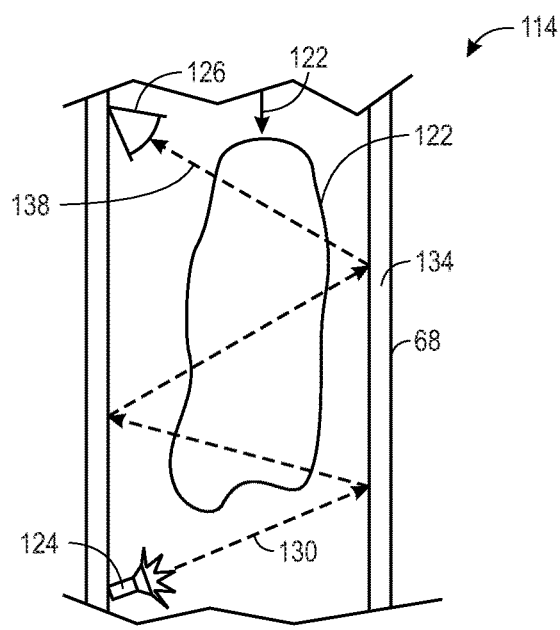
FIG. 8 is a schematic diagram of an UV tracer detection unit of the integrated, UV-based leak detection system, in accordance embodiments of the present technique.

FIG. 8 is a schematic diagram of another embodiment of the UV tracer detection unit 114 of the UV tracer sensor 100, in accordance with the present technique. More specifically, the UV tracer detection unit 114 may be used in embodiments of the UV tracer sensor 100 that do not include a sample preparation unit 112, and that instead measure the sample 104 within the monitored gas volume 106. The UV tracer detection unit 114 illustrated in FIG. 8 contains a light source 124 and a light detector 126 that is positioned downstream of a path of the emitted light 130. In operation, the light detector 126 detects a change in the intensity of light emitted by the UV light source 124 that results from the emitted light 130 interacting with the sample gas flow 122. Additionally, the UV tracer sensor 100 illustrated in FIG. 8 includes a reflective coating material 134 lining the inner wall of ductwork 68. For example, the reflective coating material 134 may be paint or mirrors. As illustrated, the light from the light source may be reflected multiple times through a sample 104 of a monitored gas volume 106 before reaching the detector, thus enabling the UV tracer sensor 100 to sample a substantial volume of air traversing the ductwork 68. In one embodiments, the reflective coating material 134 may be disposed on an inner surface of the cabinet 24 of the HVAC unit 12. In another embodiment, the reflective coating material 134 may be disposed on an inner surface of a casing 110 of the indoor HVAC unit 56, and/or on an inner surface of the casing 110 of the outdoor HVAC unit 58 to enable detection of UV tracers from leaked refrigerant that accumulates within an interior volume of these packages.

Figure 9:
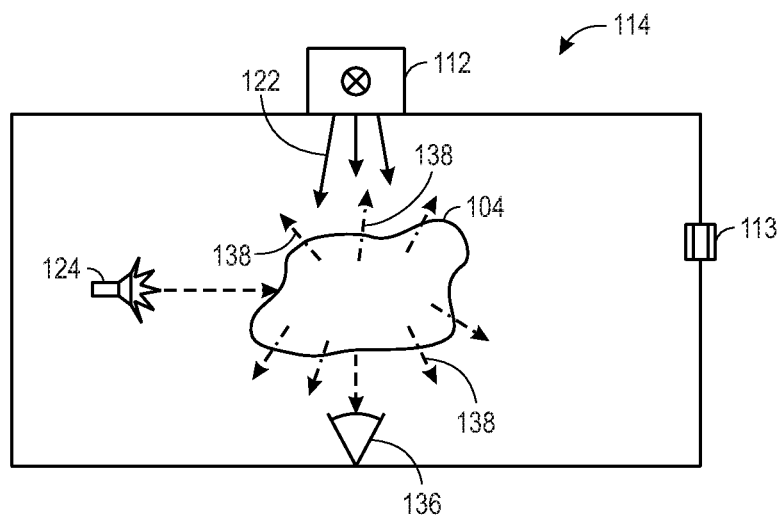
FIG. 9 is a schematic diagram of an UV tracer detection unit of the integrated, UV-based leak detection system, in accordance embodiments of the present technique.

FIG. 9 is a schematic diagram of another embodiment the UV tracer detection unit 114 of the UV tracer sensor 100 that includes a camera 136. In operation, a UV light source 124 generates emitted light 130 that is directed to a sample gas flow 122. A modified light 138 is generated based on the interaction between the emitted light 130 and the sample gas flow 122. For example, if a UV tracer is present in the sample gas flow 122, the UV tracer may scatter, or absorb and luminesce to generate modified light 138. The modified light 138 may have different optical properties than the emitted light, which can be measured by the camera 136. Different optical properties may include a change in color, frequency, or intensity of light. For example, if no UV tracers are present in the sample gas flow 122, the camera 136 may detect little to no light. When UV tracers are present, the resulting modified light 138 be a different color, frequency, or intensity based on the interaction between the emitted light 130 and the sample gas flow 122.

A magnitude of the change in color, frequency, and intensity may be used to determine an amount of UV tracers present in the sample gas flow 122. Then, the UV tracer detection unit 114 may send data signals to the microprocessor 86 of the control panel 82, or processor 116 of the control unit 102, which contain the pixel values of the images recorded by the camera 136. Based on the data signals, the microprocessor 86 may perform calculations to determine the presence of UV tracers in the sample gas flow 122. For example, a difference in the colors of each pixel may indicate optical processes, such as scattering or photoluminescence by the UV tracers, have occurred. The microprocessor 86 may compare pixel values of the image to a predefined threshold that, above or below the threshold, indicates the presence or absence of UV tracers in the sample gas. Additionally, the microprocessor 86 may determine a concentration of UV tracer present in the sample gas flow 122 based on the pixel values or integrated pixel values of the image taken by the camera 136. In certain embodiments, the microprocessor 86 may compare the image a background image. The illustrated embodiment also includes an outlet 113 which allows the gas to flow out of the UV tracer detection unit 114 after measuring the presence or concentration of UV tracers in the sample gas flow 122.

Figure 10:
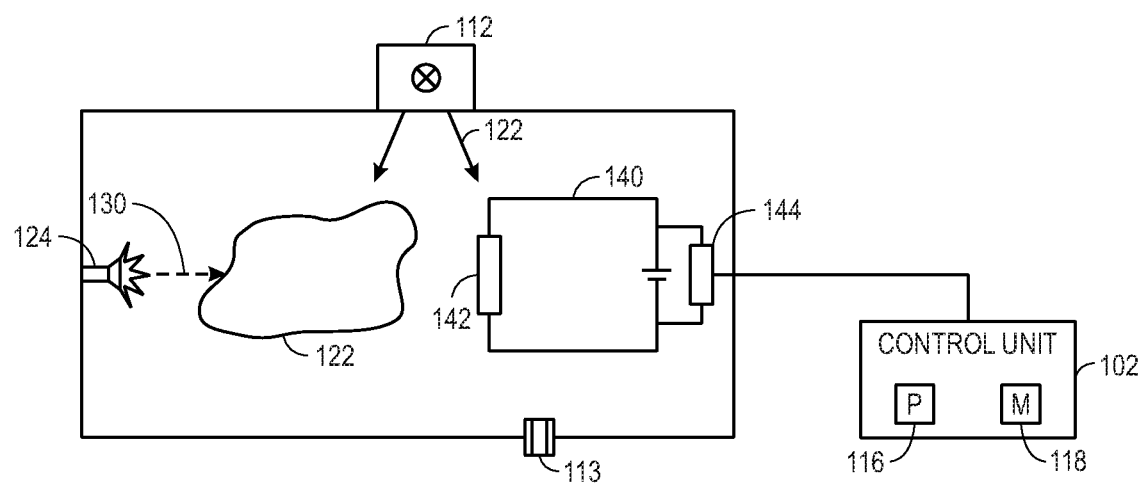
FIG. 10 is a schematic diagram of an UV tracer detection unit of the integrated, UV-based leak detection system, in accordance embodiments of the present technique.

FIG. 10 is a schematic diagram of an embodiment of the UV tracer detection unit 114 of the UV tracer sensor 100, in accordance with the present technique. The embodiment of the UV tracer detection unit 114 illustrated in FIG. 10 includes a circuit 140 that is disposed downstream from the UV light source 124. Additionally, the circuit 140 of the illustrated embodiment includes a photovoltaic material 142 disposed in a suitable position to receive the emitted light 130 from the UV light source 124. The photovoltaic material 142 may be a metal oxide, semiconductor, or organic solar. During operation of the embodiment of the UV tracer sensor 100 illustrated in FIG. 10, the photovoltaic material 142 generates an electrical signal as a result of the emitted light 130 incident on the photovoltaic material. The sample gas flow 122 received from the sample preparation unit 112 may constitute UV tracers that interact with the emitted light 130. UV tracers present in the sample gas flow 122 would reduce or block the amount of the emitted light 130 reaching the photovoltaic device, resulting in a change of a measurement electrical signal. In certain embodiments, the circuit 140 includes a multi-meter 144 communicatively coupled to the processor 116 of the control unit 102. The multi-meter 144 provides suitable signals to indicate changes in the amount of light received by the photovoltaic material 142, resulting in a change in the electrical properties of the circuit 140. Based on the change in the electrical properties of the circuit 140, the processor 116 of the control unit 102 may determine the presence or concentration of a refrigerant gas in the sample 104 collected from the monitored gas volume 106. The illustrated embodiment also includes an outlet 113 which allows the gas to flow out of the UV tracer detection unit 114 after measuring the presence or concentration of UV tracers in the sample gas flow 122

Figure 11:
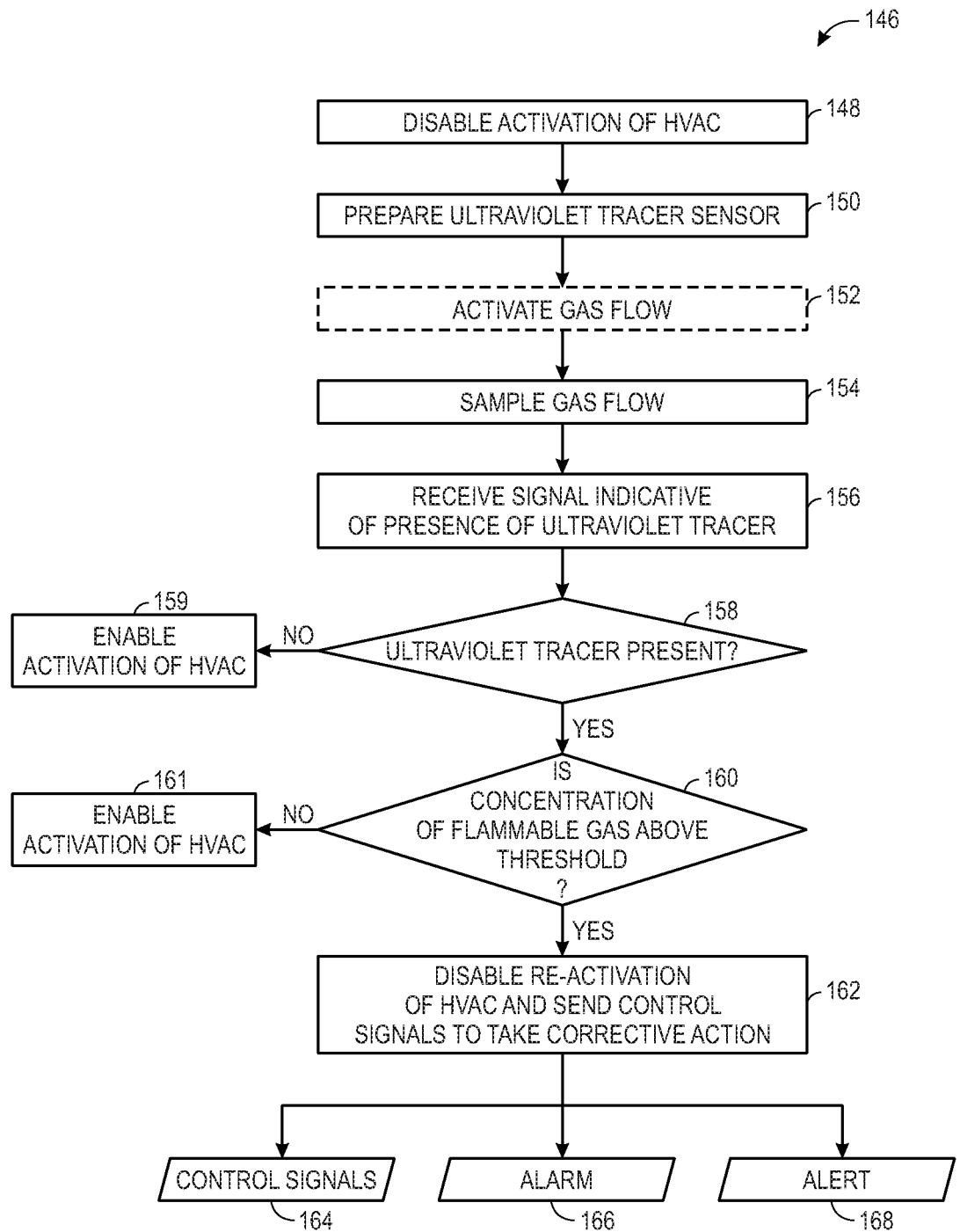
FIG. 11 is a flow diagram representing a process for operating the integrated, UV-based leak detection system of FIG. 5, in accordance with embodiments of the present technique.

FIG. 11 is a flow diagram illustrating an embodiment of a process 146 for operating the UV tracer sensor 100, in accordance with present techniques. It is to be understood that the steps discussed herein are merely exemplary, and certain steps may be omitted or performed in a different order than the order discussed herein. In some embodiments, the process 146 may be stored in the non-volatile memory 88 and executed by the microprocessor 86 of the control panel 82, or stored in the memory 118 and executed by the processor 116 of the control unit 102, or stored in other suitable memory and executed by other suitable processing circuitry.

The illustrated embodiment of the process 146 begins with the microprocessor 86 providing control signals to cycle the vapor compression system 72 of the HVAC system into an off-cycle or idle state, as indicated in block 148. For example, the control signal may deactivate the motor 94 of the compressor 74, as well as fans associated with condenser 76 and/or evaporator 80. It is presently recognized that, in certain embodiments, it is advantageous to operate the UV tracer sensor 100 when the HVAC system is idle, especially when the UV tracer sensor 100 is disposed near the evaporator 80. For example, the UV tracer may be disposed within the casing 110 of the indoor HVAC unit 56, as discussed above, or below the evaporator 80. That is, it is recognized that leaked refrigerant may accumulate in this region in the absence of the air flow present when the HVAC system is operating. For example, operating may include when the HVAC system is in an on-state, when motor 94 of the compressor 74 and fans associated with condenser 76 and evaporator 80 are activated. Additionally, it is presently recognized that, by checking for a refrigerant leak between on-cycles of the HVAC system, the microprocessor 86 can subsequently prevent reactivation of the HVAC system, preventing the risk of substantial damage to the HVAC system or the building. In certain embodiments, the microprocessor 86 of the control unit 102 of the UV tracer sensor 100 may receive a suitable signals from the microprocessor 86 of the control panel 82 to determine when the HVAC system is in an off-cycle. For embodiments in which the microprocessor 86 of the control panel 82 executes the process 148, the microprocessor 86 may provide control signals to deactivate the HVAC system before proceeding to the next step of the illustrated process 146. For example, deactivating the HVAC system may include placing the HVAC system in an off-cycle or deactivating the motor 94 of the compressor 74 and fans associated with condenser 76 and evaporator 80.

Once the vapor compression system 72 of the HVAC system is in an off-cycle, the microprocessor 86 provides suitable control signals to prepare the UV tracer sensor 100 for measurement, as indicated in block 150. In certain embodiments, preparing the UV tracer sensor 100 can involve calibrating the one or more light detectors 126 of the UV tracer detection unit 114. For example, this may involve recording baseline measurements from the UV tracer detection unit 114 before the sample 104 is collected. The baseline areas are later used for comparison to measurements obtained after the sample 104 reaches the light detectors 126. In particular, depending on the components of the UV tracer detection unit 114, calibrating can involve measuring an initial light intensity from the UV light source 124 by the light detector 126.

After the UV tracer sensor 100 is prepared, the microprocessor 86 of the control unit 102 provides suitable control signals to the sample preparation unit 112 to activate gas flow to collect the sample 104 from the monitored gas volume 106, as indicated in block 152. For example, for the embodiment of the UV tracer sensor 100 illustrated in FIG. 5, this involves the microprocessor 86 providing suitable control signals to modify the valve 108 to an open position, and potentially activating a suitable air moving device, to draw in the sample and generate the first gas flow 114. In certain embodiments where a background signal is not determined in block 150, activating a gas flow is an optional step. In these embodiments, the microprocessor 86 provides control signals to the UV tracer sensor 100 to sample gas, as indicated in block 154. For example, sample gas flow 122 is delivered to the UV tracer sensor 100 by having the UV tracer sensor 100 disposed in a suitable position for receiving an air stream generated by the HVAC systems or by simple diffusion.

Continuing through the embodiment of the process 146 illustrated in FIG. 11, the microprocessor 86 of the control panel 82 then receives signals indicative of the detection of UV tracers from the light detector 126 of the UV tracer detection unit 114, as indicated in block 156. As discussed above, the signals provided by the UV tracer detection unit 114 may be derived from optical and/or electrical signals based on the presence of UV tracers that interact with light from the UV light detectors that may be present in the sample gas flow 122.

Continuing through the embodiment of the process 146 illustrated in FIG. 11, the microprocessor 86 of the control panel 82 then determines a presence or a concentration of refrigerant within the sample 104 based at least in part on the signals received from the light detector 126, as indicated in block 158. For example, in certain embodiments, the control panel 82 may store, in the memory 88, look-up tables that relate measurement signals received from the light detector 126 with known concentrations of leaked refrigerant based on design experimentation. In other embodiments, any significant change in a measurement signal may provide a binary indication of the presence of the refrigerant in the sample 104 and the monitored gas volume 106. As illustrated, when the microprocessor 86 determines that refrigerant is not present in the sample 104, then the microprocessor 86 provides control signals to the vapor compression system 72 of the HVAC system 12 for the vapor compression system 72 to resume normal operation, based on the demands of the building 10, as indicated in block 159.

Subsequently, the microprocessor 86 of the control panel 82 may determine whether the determined presence or concentration of refrigerant is sufficient for corrective action to be taken, or if it is low enough to be taken as a false positive, as indicated in block 160. For example, in certain embodiments, the control unit 102 may store in the memory 88 a threshold value associated with a refrigerant concentration. As such, in block 160, the microprocessor 86 may compare the current determined concentration of the refrigerant to the stored threshold value. As illustrated, when the microprocessor 86 determines that the presence or concentration of the refrigerant is not sufficiently high, then the microprocessor 86 provides control signals to the vapor compression system 72 of the HVAC system 12 for the vapor compression system 72 to resume normal operation, based on the demands of the building 10, as indicated in block 161.

When the microprocessor 86 determines that the concentration of refrigerant is sufficiently high to warrant modifying operation of the HVAC system, then the microprocessor 86 may provide suitable signals to cause the HVAC system to take corrective action and disable on-cycle operation of the HVAC system, as indicated in block 162. For example, in certain embodiments, the microprocessor 86 provides signals to block or prevent the HVAC system from returning to an active state, as indicated in block 164. In certain embodiments, any amount of detected refrigerant is considered sufficiently high to trigger the microprocessor 86 to take corrective action. Additionally, in certain embodiments, the corrective action of block 162 may include the microprocessor 86 providing suitable signals to generate an alarm 166 or an alert 168 on a device associated with the HVAC system or on a device of an occupant of the building 10, to inform people of the detected refrigerant leak. For example, the device may be a computer or a mobile device. Further, in certain embodiments, the corrective action of block 162 may include the microprocessor 86 providing suitable signals to activate fans associated with the ductwork of the HVAC system to disperse the leaked refrigerant within or outside of the building 10. For example, fans associated with the ductwork 14 and/or 68 may disperse the leaked refrigerant into a larger volume to dilute to the leaked refrigerant to a reduced concentration. For embodiments in which an exhaust ventilation feature is present in the HVAC system and/or the building 10, fans associated with this exhaust feature may direct and disperse the leaked refrigerant outside of the building 10.

Accordingly, the present disclosure is directed to an UV tracer sensor that enables the detection and mitigation of refrigerant leaks. The UV tracer sensor generally detects UV tracers in a monitored gas volume. In one embodiment, the UV tracer sensor is designed to measure changes in the optical properties of light from UV light sources. In another embodiment, the UV tracer sensor measures changes in the electrical properties of components of the UV light sensor. As discussed above, these changes may occur as a result of interactions between UV tracers and UV light sources of the UV tracer detection unit of the UV tracer sensor. Accordingly, operation of the HVAC system can be controlled based, at least in part, on signals received from the disclosed UV tracer sensor. For example, in response to determining that the concentration of refrigerant is sufficiently high, a suitable processor 116 may provide control signals to take corrective action. For example, corrective action may include transmitting an alert indicative of the concentration of the refrigerant, or stopping operation of the HVAC system. In this manner, the disclosed UV tracer detector may improve operation of the HVAC system while enabling the detection and mitigation of refrigerant leaks substantially before the refrigerant may reach the predefined concentration threshold.

While only certain features and embodiments of the present disclosure have been illustrated and described, many modifications and changes may occur to those skilled in the art. For example, modifications may include variations in sizes, dimensions, structures, shapes and proportions of the various elements, values of parameters, mounting arrangements, use of materials, and orientations, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described. For example, those unrelated to the presently contemplated best mode of carrying out of the disclosure, or those unrelated to enabling the claim features may not have been described It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A leak detection system of a heating, ventilating, and air conditioning (HVAC) system, comprising:
    a sensor configured to measure a concentration of an ultraviolet (UV) tracer in a monitored gas volume of the HVAC system; and
    a controller communicatively coupled to the sensor, wherein the controller is configured to:
        determine a concentration of leaked refrigerant in the monitored gas volume based on the measured concentration of the UV tracer within the monitored gas volume; and
        modify operation of the HVAC system when the concentration of the leaked refrigerant in the monitored gas volume is greater than a predetermined threshold value.

2. The system of claim 1, comprising a sample preparation unit configured to collect a gas sample from the monitored gas volume and to prepare the gas sample for UV analysis, wherein the gas sample comprises the leaked refrigerant and the UV tracer.

3. The system of claim 2, comprising a valve communicatively coupled to the controller, wherein the valve is configured to actuate to collect the gas sample from the monitored gas volume in response to control signals from the controller.

4. The system of claim 2, wherein the sample preparation unit comprises a compressor configured to compress the gas sample to prepare the gas sample for the UV analysis.

5. The system of claim 1, wherein the sensor comprises a UV tracer detection unit configured to detect a concentration of the UV tracer in a sample collected from the monitored gas volume.

6. The system of claim 5, wherein the UV tracer detection unit comprises:
a light source configured to irradiate the gas sample with emitted light; and
a light detector configured to detect modified light from the gas sample, wherein the emitted light interacts with the sample to generate the modified light.

7. The system of claim 6, wherein the sensor is configured to use a difference between an intensity of the emitted light and an intensity of the modified light to detect the concentration of the UV tracer in the sample.

8. The system of claim 6, wherein a frequency of the emitted light is different than a frequency of the modified light, and wherein the sensor is configured to correlate an intensity of the modified light with the concentration of the UV tracer in the sample.

9. The system of claim 6, wherein the controller is configured to correlate the UV tracers being present in the sample with the concentration of leaked refrigerant in the monitored gas volume using a predetermined ratio associated with a refrigerant of the HVAC system and the UV tracer.

10. The system of claim 6, wherein the UV tracer detection unit comprises a reflective surface configured to direct the emitted light to the sample.

11. The system of claim 6, wherein the UV tracer detection unit comprises a reflective surface configured to direct modified light to the light detector.

12. The system of claim 6, wherein the UV tracer detection unit comprises a plurality of reflective surfaces, wherein the plurality of reflective surfaces is configured to cooperate to direct the emitted light to the gas sample, to direct the modified light to the light detector, or a combination thereof.

13. The system of claim 10, wherein the reflective surface is a surface of a duct of the HVAC system.

14. The system of claim 6, wherein the light detector comprises a camera configured to detect the modified light from the gas sample.

15. The system of claim 6, wherein the light detector comprises a photovoltaic device that is configured to detect the modified light from the gas sample.

16. The system of claim 1, wherein the sensor is disposed within a duct of the HVAC system, and wherein the monitored gas volume comprises conditioned air within the HVAC system.

17. The system of claim 1, wherein the sensor is disposed within a casing of an interior HVAC unit of the HVAC system, and wherein the monitored gas volume is within the casing of the interior HVAC unit.

18. The system of claim 17, wherein the HVAC system comprises an evaporator disposed within the casing of the interior HVAC unit, and wherein the sensor is disposed near the evaporator.

19. The system of claim 1, wherein the sensor is disposed within a casing of an exterior HVAC unit of the HVAC system, and wherein the monitored gas volume is within the casing of the exterior HVAC unit.

20. The system of claim 19, wherein the HVAC system comprises a condenser disposed within the casing of the exterior HVAC unit, and wherein the sensor is disposed near the condenser.

21. A leak detection system of a heating, ventilating, and air conditioning (HVAC) system, comprising:

a vapor compression system configured to circulate a refrigerant that includes an ultraviolet (UV) tracer;
a UV tracer sensor comprising a UV tracer detection unit having a light source and a light detector, wherein the light source is configured to irradiate a gas sample with emitted light, wherein the gas sample is in a monitored gas volume near the vapor compression system of the HVAC system, and wherein the light detector is configured to detect modified light from the gas sample;
a controller configured to:
output a control signal causing the light source to emit the emitted light;
receive, from the light detector, a concentration of the UV tracer based on detection of the modified light;
determine a concentration of refrigerant in the monitored gas volume based on the concentration of the UV tracer; and
modify operation of the HVAC system when the concentration of refrigerant in the monitored gas volume is greater than a predetermined threshold value wherein modifying comprises at least preventing a compressor of the HVAC system from activating.

22. The system of claim 21, wherein the UV tracer sensor comprises a sample preparation unit fluidly coupled to the UV tracer detection unit, wherein the sample preparation unit is configured to collect the gas sample from the monitored gas volume; and
wherein the controller is configured to:
determine whether the compressor associated with the HVAC system is idle; and
provide a second control signal to the sample preparation unit causing the sample preparation unit to collect the gas sample from the monitored gas volume in response to determining that compressor is idle.

23. The system of claim 21, wherein the vapor compression system comprises an evaporator, and wherein the sensor is disposed near the evaporator.

24. The system of claim 22, wherein the sample preparation unit comprises a compressor configured to compress the gas sample before the UV tracer detection unit measures the concentration of the UV tracer in the gas sample.

25. The system of claim 21, wherein the UV tracer detection unit comprises a plurality of reflective materials configured to cooperate to direct the emitted light to the gas sample, to direct the modified light to the light detector, or a combination thereof.

26. The system of claim 25, wherein the reflective materials are disposed along an inner surface of a casing of an indoor HVAC unit or outdoor HVAC unit of the HVAC system.

27. The system of claim 21, wherein the light detector comprises a camera configured to detect the modified light from the gas sample.

28. The system of claim 21, wherein the UV tracer sensor is disposed within a duct of the HVAC system, and wherein the monitored gas volume comprises conditioned air within the HVAC system.

29. A method of operating a sensor to detect a refrigerant in a monitored gas volume associated with a heating, ventilation, and air conditioning (HVAC) system, the method comprising:
collecting a sample from the monitored gas volume;
measuring an amount of ultraviolet (UV) tracer in the sample;

determining an amount of refrigerant present in the monitored gas volume based at least in part on the measured amount of UV tracer in the sample; and modifying operation of the HVAC system in response to determining that the amount of refrigerant present in the monitored gas volume is greater than a predetermined threshold value, wherein modifying the operation comprises at least preventing the compressor system from activating.

30. The method of claim 29, comprising disabling the compressor before collecting the sample.

31. The method of claim 29, comprising preparing the sensor before collecting the sample.

32. The method of claim 29, wherein modifying operation comprises activating one or more fans associated with ductwork of the HVAC system.

33. The system of claim 2, wherein the controller is configured to:

output a first control signal causing a compressor of the HVAC system to disable operation; and output a second control signal to the sample preparation unit causing the sample preparation unit to collect the gas sample from the monitored gas volume after outputting the first control signal.

34. The system of claim 29, where in the sample comprises the refrigerant and the UV tracer.

35. The system of claim 21, where in the controller is configured to:

provide a control signal that causes the compressor to disable operation before determining the concentration of the refrigerant in the monitored gas volume.

36. The system of claim 21, wherein modifying operation comprises activating one or more fans associated with a ductwork of the HVAC system.

37. The system of claim 21, wherein modifying operation comprises deactivating one or more fans associated with a condenser, an evaporator, or both, of the HVAC system.

* * * * *